United States Patent
Tomizawa et al.

(10) Patent No.: US 10,978,219 B2
(45) Date of Patent: Apr. 13, 2021

(54) ASSEMBLED WIRE, SEGMENTED CONDUCTOR, AND SEGMENT COIL AND MOTOR USING THE SAME

(71) Applicant: ESSEX FURUKAWA MAGNET WIRE JAPAN CO., LTD., Tokyo (JP)

(72) Inventors: Keiichi Tomizawa, Tokyo (JP); Akira Tachibana, Tokyo (JP); Keisuke Ikeda, Tokyo (JP); Daisuke Muto, Tokyo (JP); Hideo Fukuda, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 0 days.

(21) Appl. No.: 16/886,453

(22) Filed: May 28, 2020

(65) Prior Publication Data
US 2020/0365294 A1 Nov. 19, 2020

Related U.S. Application Data

(63) Continuation of application No. PCT/JP2019/006726, filed on Feb. 22, 2019.

(30) Foreign Application Priority Data

Mar. 12, 2018 (JP) .............................. JP2018-044426

(51) Int. Cl.
*H01B 7/02* (2006.01)
*H01F 5/06* (2006.01)
*H02K 3/30* (2006.01)

(52) U.S. Cl.
CPC ................ *H01B 7/02* (2013.01); *H01F 5/06* (2013.01); *H02K 3/30* (2013.01)

(58) Field of Classification Search
CPC .... H01B 7/02; H01B 7/00; H01F 5/06; H01F 5/00; H02K 3/30; H02K 3/04; H02K 3/34
(Continued)

(56) References Cited

U.S. PATENT DOCUMENTS 3,228,883 A * 1/1966 Di Giulio ................ C08K 5/09
                                                      174/110 PM
3,565,685 A * 2/1971 Suzuki .................... H01B 3/006
                                                      428/384
(Continued)

FOREIGN PATENT DOCUMENTS

EP       0 356 929 A1     3/1990
JP       2-106812 A       4/1990
(Continued)

OTHER PUBLICATIONS

International Search Report for PCT/JP2019/006726 (PCT/ISA/210) dated Apr. 23, 2019.
(Continued)

*Primary Examiner* — Timothy J Thompson
*Assistant Examiner* — Michael F McAllister
(74) *Attorney, Agent, or Firm* — Birch, Stewart, Kolasch & Birch, LLP (57) ABSTRACT

Provided is an assembled wire 10 having a substantially rectangular cross section, and is formed by assembling a plurality of strands 7. Each strand 7 has a conductor portion 11 and a strand insulating layer 13 covering the conductor portion 11. The strand insulating layer 13 preferably contains at least one kind of resin in which 50% weight loss in Tg-DTA occurs at from 300° C. to 500° C. The strand insulating layer 13 contains particles. The particles are particles having volume resistivity of $1 \times 10^6$ Ω·cm or more, and, for example, inorganic substances such as silica, titania, alumina, aluminum nitride, magnesium oxide, silicon nitride, and silicon carbide; and resins such as silicone are applicable.

13 Claims, 5 Drawing Sheets

(58) Field of Classification Search
USPC .................................................... 174/113 R
See application file for complete search history.

(56) References Cited

U.S. PATENT DOCUMENTS

| | | | | |
|---|---|---|---|---|
| 4,321,426 A * | 3/1982 | Schaeffer | ............. | H01F 27/323 |
| | | | | 174/34 |
| 4,493,873 A * | 1/1985 | Keane | .................... | H01B 3/303 |
| | | | | 174/120 SR |
| 4,806,806 A * | 2/1989 | Hjortsberg | ............. | H02K 15/12 |
| | | | | 310/45 |
| 5,061,554 A * | 10/1991 | Hjortsberg | ............... | H01B 3/30 |
| | | | | 428/220 |
| 5,372,886 A * | 12/1994 | Inazawa | ................ | H01B 3/105 |
| | | | | 174/110 A |
| 5,552,222 A * | 9/1996 | Bolon | .................... | H01B 3/303 |
| | | | | 174/120 SR |
| 8,476,528 B2 * | 7/2013 | Hodgson | ................. | H01B 3/46 |
| | | | | 174/110 R |
| 9,691,521 B2 * | 6/2017 | Fukuda | .................... | H02K 3/02 |
| 10,325,695 B2 * | 6/2019 | Fukuda | ................. | B32B 27/281 |
| 10,615,695 B1 * | 4/2020 | Pirozzi | ................. | H02M 3/1582 |
| 2008/0231136 A1 * | 9/2008 | Obata | ...................... | H02K 3/38 |
| | | | | 310/179 |
| 2012/0279754 A1 * | 11/2012 | Rabbia | ..................... | H02K 3/14 |
| | | | | 174/117 R |
| 2014/0246221 A1 * | 9/2014 | Bjorklund | ................ | H01B 3/40 |
| | | | | 174/120 SR |
| 2015/0206624 A1 * | 7/2015 | Choi | .................... | H01B 7/0225 |
| | | | | 174/120 C |
| 2015/0325333 A1 * | 11/2015 | Muto | ....................... | H01B 7/02 |
| | | | | 428/216 |
| 2016/0294243 A1 * | 10/2016 | Duan | ........................ | H02K 3/50 |
| 2018/0033518 A1 * | 2/2018 | Ota | ........................ | H01B 3/006 |
| 2019/0206590 A1 * | 7/2019 | Yamoto | .................... | H02K 1/16 |

FOREIGN PATENT DOCUMENTS

| | | |
|---|---|---|
| JP | 2007-227266 A | 9/2007 |
| JP | 2009-199749 A | 9/2009 |
| JP | 2013-39000 A | 2/2013 |
| JP | 2015-11861 A | 1/2015 |

OTHER PUBLICATIONS

Written Opinion of the International Searching Authority for PCT/JP2019/006726 (PCT/ISA/237) dated Apr. 23, 2019.

* cited by examiner

ASSEMBLED WIRE, SEGMENTED CONDUCTOR, AND SEGMENT COIL AND MOTOR USING THE SAME

CROSS-REFERENCE TO RELATED APPLICATIONS

This application is a Continuation of PCT International Application No. PCT/JP2019/006726 filed on Feb. 22, 2019, which claims priority under 35 U.S.C. § 119 (a) to Japanese Patent Application No. 2018-044426 filed in Japan on Mar. 12, 2018. Each of the above applications is hereby expressly incorporated by reference, in its entirely, into the present application.

TECHNICAL FIELD

The present invention relates to an assembled wire that can be used for a segment coil in a motor, for example, and the like.

BACKGROUND ART

In a stator of a motor used in a car, for example, enamel wires with circular cross sections have been conventionally used as winding wires. However, in recent years, to improve a space factor, use of flat winding wires having rectangular cross sections has been increasing. Also, a manufacturing method in which winding wires are wound around a core of a stator has been conventionally adopted in many cases. However, with adoption of the flat winding wires, a method of forming a coil by forming winding wires into segment coils of short length, installing the segment coils to a stator, and then connecting end portions of the segment coils with each other by welding have been increasingly adopted.

However, each flat winding wire has a large cross sectional area, and this leads to a problem that a winding loss may become larger due to eddy current generated when a frequency of the motor is increased due to increased rotational frequency of the motor.

To solve this, a segmented conductor in which a plurality of conducting wires are unified has been proposed. That is, using a segmented conductor formed of a plurality of conducting wires as segment coils can suppress the influence of the eddy current.

A plurality of strands having insulation layers such as oxide films on their surfaces are bundled and unified to form the segmented conductor having a substantially rectangular cross section, for example. With such a segmented conductor, a fill factor of the conductor to a slot of the stator can be improved and, since the oxide film insulates each strand, an increase in an alternating current resistance due to a skin effect and the eddy current can be suppressed.

As such a segmented conductor, for example, there is an assembled conductor formed by unifying a plurality of conducting wires, each of which includes a rectangular shaped conducting strand and a coating layer provided on outer periphery of the conducting strand (Patent Document 1).

Also, there is a coil including assembled wires formed of a plurality of linear conductors and single wires, in which portions exposing from slots of a stator are formed of the single wires that are joined to each other in its longitudinal direction (Patent Document 2).

CITATION LIST

Patent Literatures

Patent Document 1: JP-A-2007-227266 ("JP-A" means unexamined published Japanese patent application)
Patent Document 2: JP-A-2013-39000

SUMMARY OF INVENTION

Technical Problem

Figure 7A:
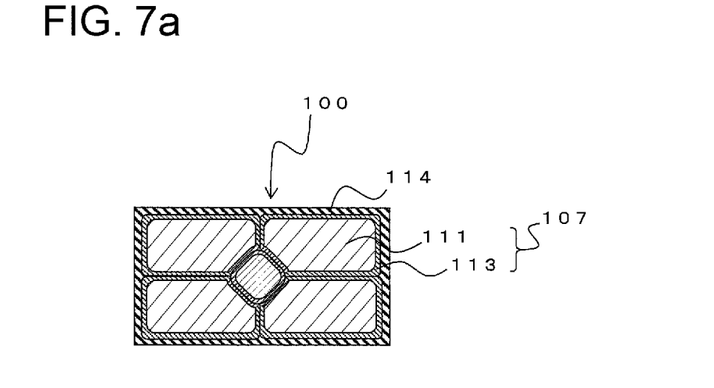
FIG. 7a is a cross sectional view showing a conventional assembled wire 100.

FIG. 7a is a cross sectional view showing an assembled wire 100 constituting a segmented conductor. The assembled wire 100 is composed of multiple strands 107. In an example depicted, for instance, five strands 107 are components of one assembled wire 100. Each strand 107 has a conductor portion 111 and a strand insulating layer 113 covering the conductor portion 111. In the assembled wire 100, all the strands 107, as a whole, are further coated with an outer insulating layer 114.

It is necessary in the assembled wire 100 to suppress heat generated when coils, to which the wire is applied, are used and/or heat deterioration due to heat from operating environment. When the strand insulating layer 113 deteriorates due to heat and the insulating property is lowered, a current loss-decreasing effect caused because the conductor is segmented becomes smaller. This necessitates prescribed or higher heat resistance to secure insulating property between conductor portions 111 of strands 107.

Figure 7B:
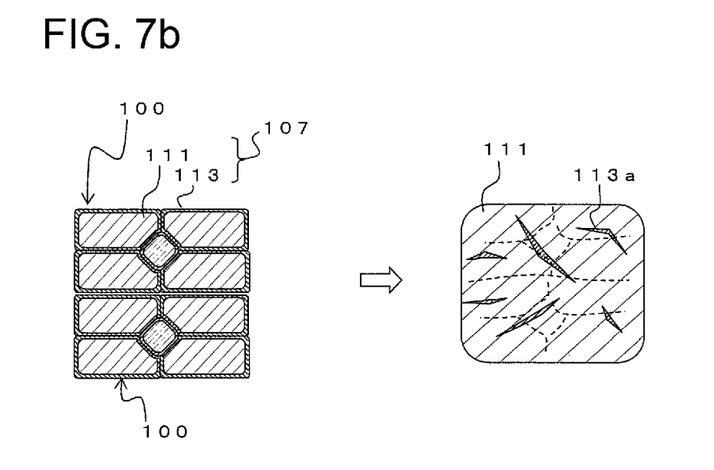
FIG. 7b is schematic diagrams illustrating a state in which end portions of the assembled wire 100 are welded to each other.

Meanwhile, when the assembled wire 100 is used as a segment coil, for instance, end portions should be welded to each other. FIG. 7b is a schematic diagram illustrating how the assembled wires 100 are welded to each other. At the time of welding, the outer insulating layer 114 is removed. Here, the strand insulating layer 113 is made of a resin. Thus, when end portions of the assembled wires 100 are welded to each other, debris 113a may be mixed in a connecting portion at the time of welding. The debris 113a primarily includes soot and/or a resin residue derived from the strand insulating layer 113.

The electric resistance in the connecting portion may increase in the presence of such debris 113a. In addition, in the presence of debris 113a, some debris may vaporize due to heat at the time of welding, which may cause a hole (blowhole) at a welded portion. This results in a decrease in the strength of the welded portion, leading to a risk of, for instance, a fracture in the connecting portion. Further, when the assembled wire 100 is bent, for instance, strands 107 at an end portion of the assembled wire 100 may disintegrate, which may make welding work difficult. Such debris 113a is likely to occur when a resin of the strand insulating layer 113, in particular, has high heat resistance.

By contrast, use of even heat-labile (low-heat-resistance) resin as the strand insulating layer 113 enables the resin to be immediately burnt up at the time of welding. Because of this, a resin residue, for instance, is unlikely to be mixed in a welded portion, and as a result of which weldability and quality of the welded portion may be favorable. However, as described previously, the strand insulating layer 113 may be at a risk of heat deterioration.

The present invention is made in light of such problems. It is an object of the present invention to provide, for instance, an assembled wire having high heat resistance so as to be able to suppress heat deterioration.

Solution to Problem

To achieve the above object, a first aspect of the present invention is an assembled wire in which a plurality of strands are assembled. The strand has a conductor portion and a strand insulating layer that coats the conductor portion. The strand insulating layer contains particles having volume resistivity of $1\times10^6$ Ω·cm or more.

The average particle diameter of the above-described particles is preferably 0.1 to 10 μm.

The addition amount of the particles is preferably 5 to 60 volume % with respect to the resin constituting the strand insulating layer.

It is desirable that the strand insulating layer contains at least one kind of resin in which 50% weight loss in Tg-DTA occurs at from 300° C. to 500° C.

A thickness of the strand insulating layer is preferably 0.5 to 30 μm.

The plurality of the strands may be twisted to one another.

At least a part of the assembled plurality of the strands in the longitudinal direction may be covered with a thermoplastic resin directly or indirectly via another insulating layer. The thermoplastic resin may be a crystalline resin, and may have flexural strength at 23° C. of 2000 MPa or more.

The thermoplastic resin may be selected from the group consisting of polyetheretherketone, modified polyetheretherketone, polyetherketoneketone, polyetherketone, polyetherketoneetherketoneketone, polyphenylene sulfide, and thermoplastic polyimide.

According to the first aspect of the present invention, because the strand insulating layer contains particles having a volume resistivity of $1\times10^6$ Ω·cm or more, it is possible to elicit high insulating performance and maintain the insulating performance by using the particles even if the insulating property of a resin as a component of the strand insulating layer deteriorates.

When the particles have an average particle diameter of 0.1 μm or larger, in particular, workability is excellent and sufficient insulating performance can be secured. In addition, when the particles have an average particle diameter of 10 μm or smaller, detachment at the time of, for instance, resin extension or deformation is unlikely to occur and processability can be kept. Also, the thickness of the strand insulating layer can be reduced.

In addition, when the addition amount of particles is from 5 to 60 volume % with respect to a resin as a component of the strand insulating layer, both sufficient insulating performance and resin flexibility can be established.

In addition, when 50% weight loss in Tg-DTA of a resin in the strand insulating layer occurs at from 300° C. to 500° C., the resin is easily burnt up at the time of welding. This can prevent any resin residue, etc., from being mixed in a welded portion.

When the thickness of the strand insulating layer is 0.5 to 30 μm, the bending processability of the strand insulating layer is good, and the insulating performance can be ensured.

In addition, when multiple strands are twisted to one another, the strand disintegration is unlikely to occur.

In addition, when each whole strand is coated by a thermoplastic resin that is a crystalline resin and has a flexural strength at 23° C. of 2000 MPa or higher, there is no damage at the time of bending and insulating performance can be secured. In this case, the thermoplastic resin can be selected from the group consisting of polyetheretherketone, modified polyetheretherketone, polyetherketoneketone, polyetherketone, polyetherketoneetherketoneketone, polyphenylene sulfide, and thermoplastic polyimide.

The second aspect of the present invention is a segmented conductor, wherein the assembled wire according to the first aspect of the present invention is cut into short lengths, and on at least both end portions of the assembled wire, the thermoplastic resin is not formed and each strand is exposed.

The segmented conductor is preferably formed as one body in its longitudinal direction without joint portions that connect between the conductor portions.

According to the second aspect of the present invention, a thermoplastic resin is not provided at both end portions. Consequently, when the resulting segmented conductors are used as a segment coil, there is no occurrence of, for instance, debris, due to a thermoplastic resin, at a welded portion between the both end portions.

In addition, the segmented conductor is integrally formed without any joint portion in the longitudinal direction. Accordingly, it is unnecessary to connect a plurality of kinds of conducting wire. Hence, the segmented conductor has no joint portion in the longitudinal direction and is highly reliable over the entire length in the longitudinal direction. Also, because it is unnecessary to connect a plurality of conducting wires in the longitudinal direction, production is easy.

A third aspect of the present invention is a segment coil or a motor using the assembled wire according to the first aspect of the present invention.

According to the third aspect of the present invention, a reliable segment coil or motor can be obtained.

Advantageous Effects of Invention

According to the present invention, it is possible to provide an assembled wire having high heat resistance so as to be able to suppress heat deterioration, and the like.

BRIEF DESCRIPTION OF THE DRAWINGS

FIG. 1b is an enlarged view of area X in FIG. 1a.

MODE FOR CARRYING OUT THE INVENTION

Figure 1A:
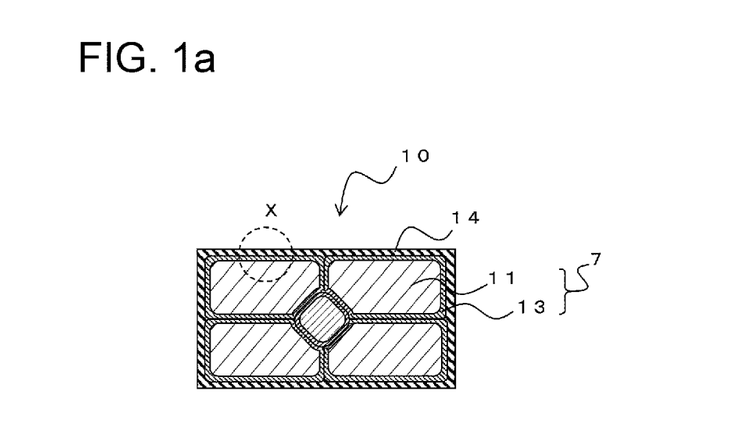
FIG. 1a is a cross sectional view showing an assembled wire 10.

Hereinafter, some embodiments of the present invention will be described with reference to the accompanying drawings. FIG. 1a is a cross sectional view showing an assembled wire 10. The assembled wire 10 has a substantially rectangular shaped cross section and is formed by assembling a plurality of strands 7. Note that in the example depicted, an embodiment, in which one strand at an approximately center portion and four strands at the surrounding are arranged, is illustrated. However, the number of strands 7, and the arrangement of the strand 7 are not limited to the illustrated example.

Each strand 7 includes a conductor portion 11 and a strand insulating layer 13 that covers the conductor portion 11. The conductor portion 11 is made of copper or copper alloy, for example.

A thickness of the strand insulating layer 13 is preferably 0.5 to 30 μm. If the strand insulating layer 13 is too thin, the insulating performance deteriorates. If the thickness of the strand insulating layer 13 is too large, the bending processability of the strand insulating layer 13 deteriorates, and a space factor of the conductor portion 11 is also impaired.

At least a part of the assembled plurality of the strands 7 in the longitudinal direction is covered with an outer insulating layer 14 directly or indirectly via another insulating layer. The outer insulating layer 14 is, for example, a thermoplastic resin. It is preferable to use, as the thermoplastic resin, a crystalline resin having flexural strength at 23° C. of 2000 MPa or more.

Such a thermoplastic resin can be selected from the group consisting of polyetheretherketone, modified polyetheretherketone, polyetherketoneketone, polyetherketone, polyetherketoneetherketoneketone, polyphenylene sulfide, and thermoplastic polyimide. Thus, it is possible to obtain the outer insulating layer 14 having good bending processability and durability.

Figure 1B:
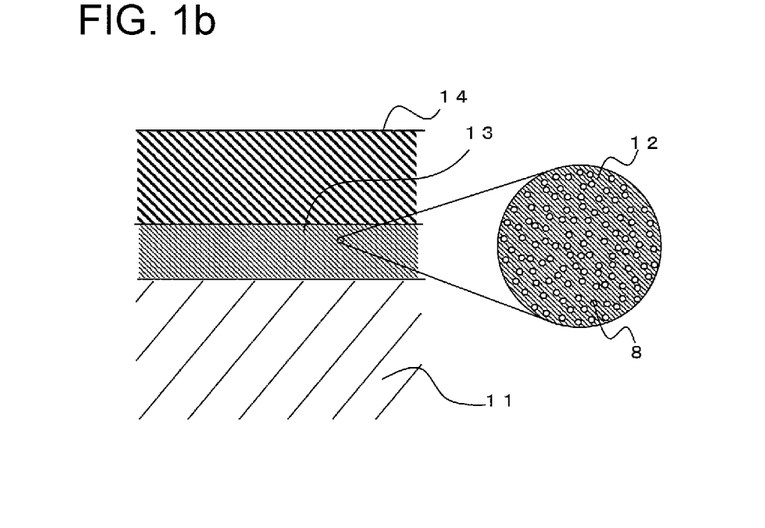

FIG. 1b is a partially enlarged view of area X in FIG. 1a. A resin 12 as a component of the strand insulating layer 13 contains particles 8. As the resin 12, it is desirable to include at least one kind of resin in which 50% weight loss in Tg-DTA occurs at from 300° C. to 500° C. As the resin 12, for example, polyamide, polyurethane, epoxy, polyester, nylon, polyethylene terephthalate, or the like can be applied.

The particles 8 are particles having volume resistivity of $1 \times 10^6$ Ω·cm or more, and, for example, inorganic substances such as silica, titania, alumina, aluminum nitride, magnesium oxide, silicon nitride, and silicon carbide; and resins such as polyimide (PI) silicone are applicable. The volume resistivity of the particles is measured at 20° C. in accordance with JIS C 2139: 2008. The particles 8 improve the heat resistance and the insulating property of the strand insulating layer 13.

The average particle diameter of the particles 8 is 0.1 to 10 μm. If the particles 8 are too small, the handleability is poor, and it is difficult to ensure the insulating performance. By contrast, when the size of the particles 8 is too large, the bending property deteriorates and the thickness of the strand insulating layer 13 becomes thicker. This is undesirable. Note that the size of the particles 8 is the median diameter in a particle distribution obtained by laser diffraction after the particles are evenly dispersed based on JIS Z 8824.

The addition amount of the particles 8 is preferably 5 to 60 volume % with respect to the resin 12 constituting the strand insulating layer 13. When the addition amount of particles 8 is too small, the effect obtained by adding the particles 8 is small. In addition, when the addition amount of particles 8 is too large, the volume of the resin 12 is too small. This is likely to cause a crack in the strand insulating layer 13 when bent.

Figure 2:
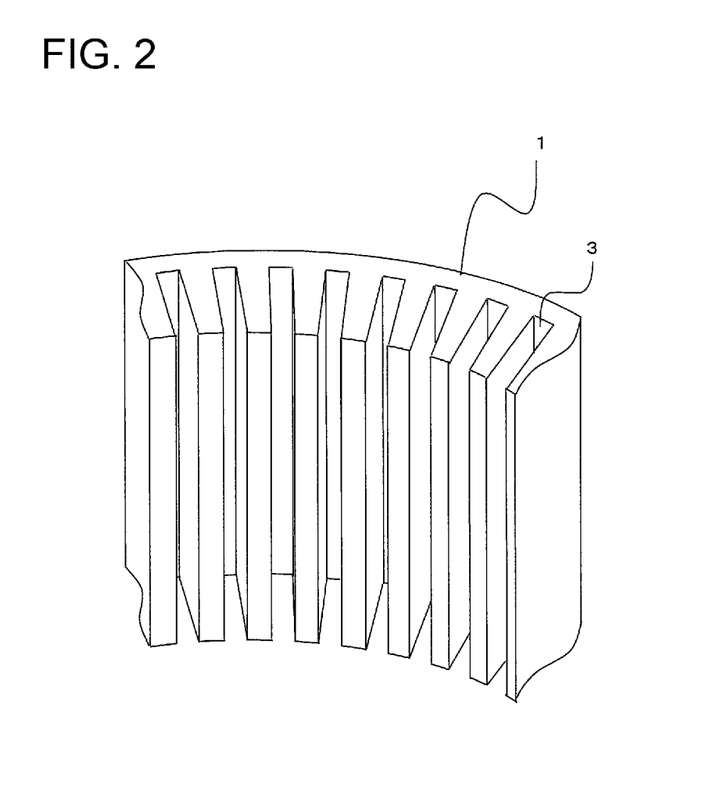
FIG. 2 is a partial perspective view showing a stator core 1.

Next, a segment coil in which the assembled wire 10 is used will be described. The segment coil is used in, for example, a car motor. FIG. 2 is a partial perspective view showing a stator core 1 used in a motor. The stator core 1 is in a substantially cylindrical shape and is formed by laminating electromagnetic steel sheets, for example. On an inner periphery side of the stator core 1, a plurality of slots 3 are provided. A conductor is disposed in each slot 3 and joining the conductors with each other forms a coil.

Figure 3:
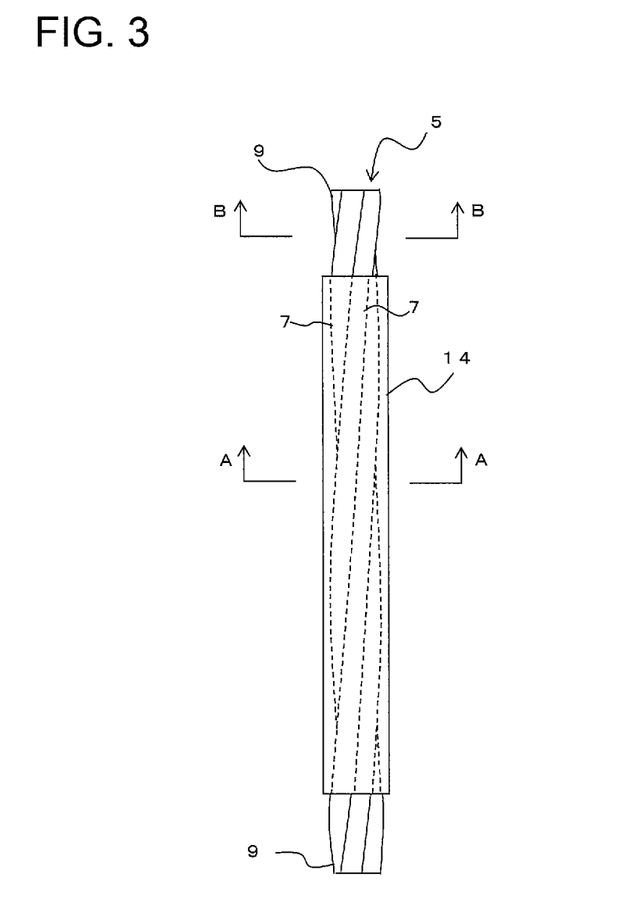
FIG. 3 is a plan view showing a segmented conductor 5.
Figure 4A:
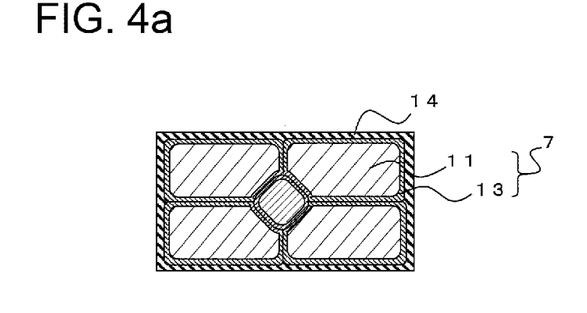
FIG. 4a is a cross sectional view of the segmented conductor 5, taken along A-A line in FIG. 3.
Figure 4B:
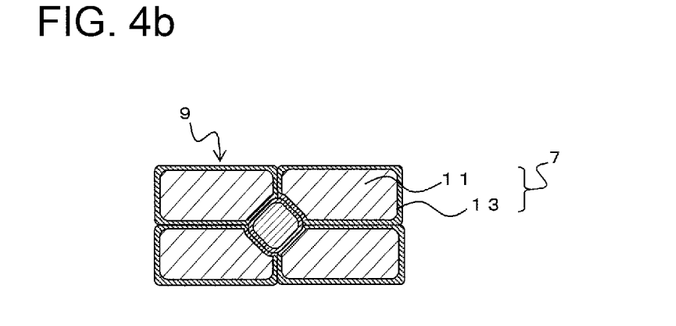
FIG. 4b is a cross sectional view of the segmented conductor 5, taken along B-B line in FIG. 3.

FIG. 3 is a plan view of a segmented conductor 5 for the segment coil that is to be disposed in the slot 3. FIG. 4a is a cross sectional view taken along A-A line in FIG. 3, and FIG. 4b is a cross sectional view taken along B-B line in FIG. 3. The segmented conductor 5 is formed by cutting the assembled wire 10 into short lengths. That is, the segmented conductor 5 includes at least the plurality of the strands 7. The strands 7 are twisted to one another.

As shown in FIG. 4b, the outer insulating layer 14 is removed at both end portions 9 of the segmented conductor 5. That is, on at least both end portions of the assembled wire 10, the outer insulating layer 14 is not formed and the strand 7 is exposed. In the embodiments hereinafter, examples in which the outer insulating layer 14 at the end portions 9 is removed will be illustrated. However, the outer insulating layer 14 may be formed up to the end portions 9.

Figure 5:
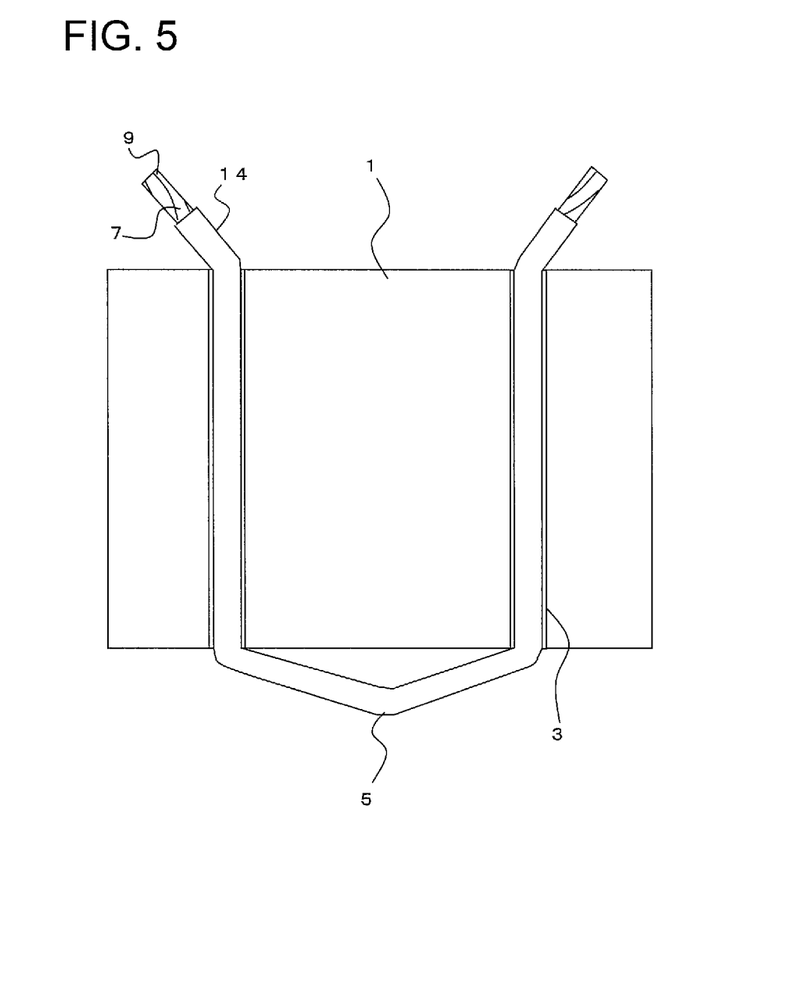
FIG. 5 is a schematic view showing a state in which the segmented conductor 5 is disposed in slots 3.

FIG. 5 is a schematic view showing a state in which the segmented conductor 5 is disposed in the slots 3 when viewed from an inner surface side of the stator core 1. The drawing shows only a part of the stator core 1. As mentioned above, the segmented conductor 5 is bent into a predetermined shape and disposed into the slots 3. At this time, the end portions 9 of the segmented conductor 5 protrude from an upper part of the stator core 1 and a bent portion of the segmented conductor 5 is exposed from a lower part of the stator core 1.

In the example shown in FIG. 4b, only the outer insulating layer 14 is removed at the end portions 9, and the strand 7 includes the conductor portion 11 and the strand insulating layer 13. However, the strand insulating layer 13 may also be further removed. For instance, at the both end portions 9 of the segmented conductor 5, the conductor portion 11 may be exposed to the outside while neither the outer insulating layer 14 nor the strand insulating layer 13 of resin type is formed.

Next, a method of producing the segmented conductor 5 is described. First, a plurality of strands 7 are disposed in a given arrangement to bundle the strands to one another. The strand has a conductor portion 11 and a strand insulating layer 13 that coats the conductor portion 11.

While twisted, the strands as so arranged are molded using, for instance, a mold into a rectangular shape and subsequent extrusion, for instance, is performed to coat the most outer peripheral surface with a resin-made outer insulating layer 14. The above steps may be used to form the assembled wire 10 as shown in FIG. 1a.

Next, the assembled wire 10 is cut into short lengths, and the strand insulating layer 13 and the outer insulating layer 14 are optionally removed just at the both end portions 9. The strand insulating layer 13 and the outer insulating layer 14 are, for example, removed by a mechanical method such as polishing, or a chemical method such as etching. Note that when the strand insulating layer 13 is left, only the outer insulating layer 14 is removed. In addition, after bent into a required shape, the segmented conductor 5 is formed. Each of the strands 7 is unified in its longitudinal direction, and thus the segmented conductor 5 is formed as one body in its longitudinal direction without joint portions that connect between the conductor portions.

Next, welding of the segmented conductors 5 will be described. As shown in FIG. 5, the end portion 9 of the segmented conductor 5 protruding above the stator core 1 is joined with the end portion 9 of the other adjacent segmented conductor 5 (not illustrated) by welding. Connecting all the segmented conductors 5 to each other forms a segment coil.

Figure 6:
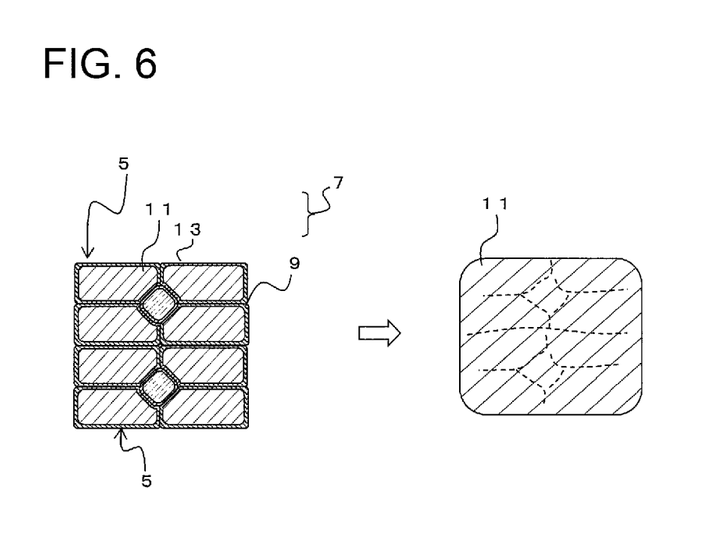
FIG. 6 is schematic diagrams illustrating a state in which end portions 9 are welded to each other.

FIG. 6 is schematic diagrams illustrating a state in which end portions of the segmented conductors 5 are welded to each other. In this embodiment, only the outer insulating layer 14 at each end portion 9 is removed and the strand insulating layer 13 is exposed for welding.

Here, the strand insulating layer 13 contains a resin 12 in which 50% weight loss in Tg-DTA occurs at from 300° C. to 500° C. In the resin 12, the 50% weight loss in Tg-DTA occurs at 500° C. or lower. Accordingly, the heat resistance is low, and the resin is completely burnt up due to heat at the time of welding and is then gasified. This can prevent debris such as a resin residue from being mixed in a welded portion. Also, in the resin 12, the 50% weight loss in Tg-DTA occurs at 300° C. or higher. Accordingly, it is possible to suppress deterioration at the time of use and/or at the time of extrusion/coating of the outer insulating layer 14.

Note that the particles 8 have a small size and can thus be blown off by gas used at the time of welding. Further, even if the particles 8 are mixed in a welded portion, the particles 8 are neither decomposed nor vaporized due to heat. Thus, no blowhole occurs. This can prevent, for instance, a fracture in the welded portion.

ing property. This can prevent the strand insulating layer 13 from being subject to heat deterioration.

In addition, because 50% weight loss in Tg-DTA occurs at from 300° C. to 500° C., a resin of the strand insulating layer 13 can be easily burnt up at the time of welding. This can prevent debris such as a resin residue from being mixed in a welded portion. That is, both weldability and durability can be established.

Besides, because the outer insulating layer 14 is made of a thermoplastic resin, it is possible to secure sufficient insulating performance, durability, flexibility, and so on.

EXAMPLES

Next, a plurality of types of segmented conductors with different strand insulating layers and the like are made and evaluated in weldability, bending processability and high frequency performance. In the segmented conductor, six strands each having a conductor portion and a strand insulating layer were twisted and then molded using a mold into a rectangular shape. Subsequently, a thermoplastic resin was used to form an outer insulating layer. Working examples 1 to 10 according to the present invention are shown in Table 1. Also, comparative examples 1 to 5 are shown in Table 2.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Strand insulating layer | Kind | Urethane | PA66 | PET | Urethane | PA66 | Urethane | PET | Urethane | Urethane | PA66 |
|  | Coating thickness (μm) | 3 | 5 | 30 | 1 | 10 | 0.5 | 20 | 3 | 3 | 20 |
| Outer insulating layer | Kind | PEEK | PPS | PEEK | PEEK | PEEK | PEEK | PEEK | PEEK | PEEK | PEEK |
| Insulating particles | Kind | $SiO_2$ | $SiO_2$ | $SiO_2$ | $TiO_2$ | PI particle | $SiO_2$ | $SiO_2$ | $SiO_2$ | $SiO_2$ | $SiO_2$ |
|  | Addition amount (%) | 10 | 30 | 50 | 5 | 60 | 20 | 30 | 3 | 65 | 10 |
|  | Average particle diameter (μm) | 0.1 | 0.3 | 1.0 | 0.1 | 3 | 0.1 | 10 | 0.2 | 0.2 | 20 |
|  | Volume resistivity (Ω · cm) | $10^{14}$ | $10^{14}$ | $10^{14}$ | $10^{14}$ | $10^{14}$ | $10^{14}$ | $10^{14}$ | $10^{14}$ | $10^{14}$ | $10^{14}$ |
| Weldability |  | A | A | B | A | A | A | A | A | A | A |
| Bending processability |  | A | A | A | A | A | A | A | A | B | B |
| High frequency characteristic (Room temperature) |  | A | A | A | A | A | A | A | A | A | A |
| High frequency characteristic (220° C. × 2,000 hours) |  | A | A | A | A | A | A | A | B | A | A |

Remarks: 'Ex' means Example according to this invention.

Note that when the heat resistance characteristic of the strand insulating layer 13 is made low, the strand insulating layer 13 deteriorates due to heat when the wire is used as a segment coil. As a result, the insulating characteristic may deteriorate. However, this embodiment includes particles 8, so that the insulating property can be secured by the particles 8. In addition, the particles 8 are unlikely to be debris that imparts harmful effects to the mechanical properties and/or electrical properties of the welded portion. This makes it possible to establish both durability against heat and reliability of the welded portion.

Collectively, this embodiment can secure high insulating property of the strand insulating layer 13 because the strand insulating layer 13 contains particles 8 having high insulat-

TABLE 2

|  |  | CEx. 1 | CEx. 2 | CEx. 3 | CEx. 4 | CEx. 5 |
|---|---|---|---|---|---|---|
| Strand insulating layer | Kind | — | PAI | PA66 | Urethane | PA66 |
|  | Coating thickness (μm) | — | 5 | 3 | 0.5 | 5 |
| Outer Insulating layer | Kind | PEEK | PEEK | PEEK | PEEK | PEEK |
| Insulating particles | Kind | — | — | — | — | C |
|  | Addition Amount (%) | — | — | — | — | 45 |

TABLE 2-continued

|  | CEx. 1 | CEx. 2 | CEx. 3 | CEx. 4 | CEx. 5 |
|---|---|---|---|---|---|
| Average particle diameter (μm) | — | — | — | — | 1.0 |
| Volume resistivity (Ω · cm) | — | — | — | — | $10^3$ |
| Weldability | A | D | A | A | A |
| Bending processability | A | A | A | A | A |
| High frequency characteristic (Room temperature) | D | A | A | A | D |
| High frequency characteristic (220° C. × 2,000 hours) | A | A | D | D | D |

Remarks: 'CEx' means Comparative Example.

As the strand insulating layer, urethane, nylon (PA66), polyethylene terephthalate (PET), and polyamideimide (PAI) are used. Also, as the outer insulating layer, a thermoplastic resin, such as polyetheretherketone (PEEK) and polyphenylene sulfide (PPS), is used.

The weldability in the tables were evaluated after the outer insulating layers at both ends were removed; a pair of the segmented conductors with the strand insulating layer being exposed were welded to each other while an arc discharge was generated under conditions at a welding current of 30 A and a welding time of 0.1 sec. The case where no weld ball was formed at a welded site was determined to be impossible to weld.

More specifically, the case where there was no color change at or near a welded site of the segmented conductor and a weld ball was formed at an end of the segmented conductor was graded as "A" because the weldability was excellent. In addition, the case where although soot occurred at or near a welded site of the segmented conductor, a weld ball was still formed at an end of the segmented conductor was graded as "B" as favorable. In addition, the case where there was no color change at or near a welded site of the segmented conductor and no weld ball was formed at an end of the segmented conductor was graded as "C" because the weldability was poor. In addition, the case where soot occurred at or near a welded site of the segmented conductor and no weld ball was formed at an end of the segmented conductor was graded as "D" as impossible to weld. Note that when the weldability was graded as "A" or "B", the segmented conductor was determined to pass the test.

The bending processability was evaluated by checking the presence or absence of a coating film crack at a top bent portion after the strand insulating layer was stretched by 10% and a linear test piece was then bent 180 degrees (into a U-shape) by using a core with a diameter of 1.0 mm as an axis. The case where a crack was seen was graded as "D". Further, in the case of no observed crack, the strand insulating layer was stretched by up to 20% and was likewise evaluated. The case of no crack after 20% stretching was graded as "A". The case where although no crack was observed after 10% stretching, a crack after 20% stretching was observed was graded as "B". The case A can endure more stringent processing. Here, in the case B, it is still possible to produce a motor. Thus, these cases A and B were determined to pass the test.

The high frequency characteristic was evaluated under conditions at both room temperature and 220° C.×2000 hours. The high frequency performance in the tables is evaluated by operating an alternating current magnetic field generator under conditions of 1000 Hz, 2.16 A, and 138 Vrms to generate an alternating current magnetic field of 50 mT. When a test piece is placed inside the magnetic field, heat is generated due to eddy current. A calorific value of this generated heat is measured as a current loss (W). An amount of current loss W0 of a conductor that is made of a no-assembled conductor with an extrusion coated strand insulating layer is calculated as above. When a ratio of the amount of current loss W to W0 of each piece is 0.8 or less (a suppression ratio of the amount of loss is 20% or more), the high frequency performance is evaluated as good and graded as 'B'. Furthermore, when the above ratio is 0.4 or less (the suppression ratio of the amount of loss is 60% or more), the high frequency performance is evaluated as excellent and graded as 'A'. On the other hand, when the above ratio is more than 0.8 (the suppression ratio of the amount of loss is less than 20%), the high frequency performance is evaluated as inferior and graded as 'D'.

The results have demonstrated that all the Examples 1 to 10 including particles in the strand insulating layer were determined to pass the test. In Example 3, the weldability was graded as 'B', because the coating thickness was thick. In Example 8, the high frequency performance after holding at a high temperature was graded as 'B', because the addition amount of the particles was small. In Example 9, the bending property was graded as 'B', because the addition amount of the particles was large. In Example 10, the bending property was graded as 'B', because the diameter of the particles was large.

On the other hand, the high frequency performance of Comparative Example 1 was graded as 'D', because any strand insulating layer was not provided. The weldability of Comparative Example 2 was graded as 'D', because the strand insulating layer had high heat resistance. The high frequency performance after holding at a high temperature of Comparative Examples 3 and 4 was graded as 'D', because the strand insulating layer had low heat resistance. The high frequency performance of Comparative Example 5 was graded as 'D', because the used particles were carbon having low volume resistivity.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

REFERENCE SIGNS LIST

1 . . . Stator core
3 . . . Slot
5 . . . Segmented conductor
7 . . . Strand
8 . . . Particle
9 . . . End portion
10 . . . Assembled wire
11 . . . Conductor portion
12 . . . Resin
13 . . . Strand insulating layer
13 . . . Outer insulating layer
100 . . . Assembled wire
107 . . . Strand
111 . . . Conductor portion
113 . . . Strand insulating layer 113a . . . Debris
114 . . . Outer insulating layer

The invention claimed is:

1. An assembled wire in which a plurality of strands are assembled, wherein:
    each strand comprises a conductor portion and a strand insulating layer that coats the conductor portion;
    the strand insulating layer comprises particles having volume resistivity of $1 \times 10^6$ Ω·cm or more;
    at least a part of the assembled plurality of strands in a longitudinal direction is covered with a thermoplastic resin directly or indirectly via another insulating layer; and
    the thermoplastic resin is a crystalline resin, and has a flexural strength at 23° C. of 2000 MPa or more.

2. The assembled wire according to claim 1, wherein an average particle diameter of the particles is 0.1 to 10 μm.

3. The assembled wire according to claim 1, wherein the particles comprise silica, titania, alumina, aluminum nitride, magnesium oxide, silicon nitride, silicon carbide or polyimide silicone.

4. The assembled wire according to claim 1, wherein the strand insulating layer comprises polyamide, polyurethane, epoxy, polyester, nylon, or polyethylene terephthalate.

5. The assembled wire according to claim 1, wherein an addition amount of the particles is 5 to 60 volume % with respect to a resin constituting the strand insulating layer.

6. The assembled wire according to claim 1, wherein the strand insulating layer includes at least one kind of resin in which 50% weight loss in Tg-DTA occurs at from 300° C. to 500° C.

7. The assembled wire according to claim 1, wherein a thickness of the strand insulating layer is 0.5 to 30 μm.

8. The assembled wire according to claim 1, wherein the plurality of the strands are twisted to one another.

9. The assembled wire according to claim 1, wherein the thermoplastic resin is polyetheretherketone, modified polyetheretherketone, polyetherketoneketone, polyetherketone, polyetherketoneetherketoneketone, polyphenylene sulfide, or thermoplastic polyimide.

10. A segmented conductor, wherein the assembled wire according to claim 1 is cut into short lengths, and on at least both end portions of the assembled wire, the thermoplastic resin is not formed and each of the strands is exposed.

11. The segmented conductor according to claim 10, which is formed as one body in its longitudinal direction without joint portions that connect between the conductor portions.

12. A segment coil comprising the assembled wire according to claim 1.

13. A motor comprising the assembled wire according to claim 1.

* * * * *